(12) United States Patent
Kuznetsov

(10) Patent No.: US 11,038,398 B2
(45) Date of Patent: Jun. 15, 2021

(54) SYSTEM AND METHOD FOR DAMPING OF TORSIONAL OSCILLATIONS IN LARGE INERTIAL ENERGY STORAGE SYSTEMS

(71) Applicant: Raytheon Company, Waltham, MA (US)

(72) Inventor: Stephen Kuznetsov, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 339 days.

(21) Appl. No.: 16/019,206

(22) Filed: Jun. 26, 2018

(65) Prior Publication Data

US 2019/0393754 A1   Dec. 26, 2019

(51) Int. Cl.
  *H02K 7/02*  (2006.01)
  *F03G 3/08*  (2006.01)
  *F16F 15/30* (2006.01)
  *H02K 47/22* (2006.01)

(52) U.S. Cl.
  CPC .............. *H02K 7/025* (2013.01); *F03G 3/08* (2013.01); *F16F 15/30* (2013.01); *H02K 47/22* (2013.01)

(58) Field of Classification Search
  CPC ...... H02K 7/025; H02K 47/22; H02P 25/062; F03G 3/08; F16F 15/30
  See application file for complete search history.

(56) References Cited

U.S. PATENT DOCUMENTS

| | | | |
|---|---|---|---|
| 1,646,823 A | 10/1927 | Vladimir et al. | |
| 2,149,082 A | 2/1939 | Buell et al. | |
| 2,740,510 A | 4/1956 | Wolf et al. | |
| 3,004,381 A | 10/1961 | Schweitzer et al. | |
| 3,024,298 A | 3/1962 | Goltsos et al. | |
| 3,183,431 A | 5/1965 | William et al. | |
| 3,187,250 A | 6/1965 | Born et al. | |
| 3,315,148 A | 4/1967 | Joseph et al. | |
| 3,452,229 A | 6/1969 | Pimlott et al. | |
| 3,571,693 A | 3/1971 | Riaz et al. | |

(Continued)

FOREIGN PATENT DOCUMENTS

EP   0849170 A1   6/1998
SU   1358721 A1   4/1994

(Continued)

OTHER PUBLICATIONS

International Search Report and Written Opinion of the International Searching Authority in connection with PCT Patent Application No. PCT/US2019/032791 dated Aug. 2, 2019, 12 pages.

(Continued)

*Primary Examiner* — Emily P Pham

(57) ABSTRACT

An energy storage system includes a power source configured to generate power. The energy storage system also includes an induction machine coupled to an inertial flywheel, the induction machine configured to receive electrical energy from the power source, store the energy in the flywheel, and deliver a first portion of the energy to a first pulsed load. The energy storage system further includes a damping network configured to receive and absorb a second portion of the energy at a controlled rate to regulate torsional oscillations in a rotary motion of the flywheel caused by load swings or pulsations of the first pulsed load.

20 Claims, 12 Drawing Sheets

(56) References Cited

U.S. PATENT DOCUMENTS

| | | | |
|---|---|---|---|
| 3,667,012 | A | 5/1972 | Kilgore et al. |
| 4,001,666 | A | 1/1977 | Grenfell |
| 4,011,535 | A | 3/1977 | Kosky et al. |
| 4,048,603 | A | 9/1977 | Staub et al. |
| 4,393,964 | A | 7/1983 | Kemper |
| 4,439,720 | A | 3/1984 | Georges |
| 4,444,444 | A | 4/1984 | Benedetti et al. |
| 4,602,200 | A | 7/1986 | Walker |
| 4,612,494 | A | 9/1986 | Kawamura |
| 4,926,107 | A | 5/1990 | Pinson |
| 4,971,522 | A | 11/1990 | Butlin |
| 5,097,194 | A | 3/1992 | Walton et al. |
| 5,646,458 | A | 7/1997 | Bowyer et al. |
| 5,921,505 | A | 7/1999 | Spector |
| 6,023,152 | A | 2/2000 | Briest et al. |
| 6,078,119 | A | 6/2000 | Satoh et al. |
| 6,161,495 | A | 12/2000 | Ambs |
| 6,239,513 | B1 | 5/2001 | Dean et al. |
| 6,573,626 | B1 | 6/2003 | Gosebruch et al. |
| 6,710,579 | B2 | 3/2004 | Ebel et al. |
| 7,663,328 | B2 | 2/2010 | Gonder |
| 7,710,081 | B2 | 5/2010 | Saban et al. |
| 9,373,963 | B2 | 6/2016 | Kuznetsov |
| 9,531,247 | B2 | 12/2016 | Kuznetsov |
| 9,531,289 | B2 | 12/2016 | Kuznetsov |
| 9,667,232 | B2 | 5/2017 | Kuznetsov |
| 9,837,996 | B2 | 12/2017 | Kuznetsov |
| 2005/0012395 | A1 | 1/2005 | Eckroad et al. |
| 2006/0244425 | A1* | 11/2006 | Sihler ............... H02P 9/105 322/58 |
| 2008/0103632 | A1 | 5/2008 | Saban et al. |
| 2008/0177425 | A1* | 7/2008 | Korba ............... H02J 3/1814 700/297 |
| 2009/0134705 | A1 | 5/2009 | Kalev |
| 2011/0084568 | A1 | 4/2011 | Lateb et al. |
| 2012/0187922 | A1 | 7/2012 | Dubois et al. |
| 2012/0286523 | A1 | 11/2012 | Hull et al. |
| 2013/0020893 | A1 | 1/2013 | Bradley et al. |
| 2013/0127391 | A1 | 5/2013 | Lewis |
| 2013/0257186 | A1 | 10/2013 | Kozar et al. |
| 2013/0260999 | A1 | 10/2013 | Hull et al. |
| 2013/0261001 | A1 | 10/2013 | Hull et al. |
| 2013/0285491 | A1 | 10/2013 | Kuznetsov |
| 2014/0346868 | A1 | 11/2014 | Kuznetsov |
| 2015/0035501 | A1* | 2/2015 | Rozman ............ H02P 29/50 322/29 |
| 2016/0336928 | A1 | 11/2016 | Kuznetsov |

FOREIGN PATENT DOCUMENTS

| | | |
|---|---|---|
| WO | 02061910 A2 | 8/2002 |
| WO | 2018/004765 A2 | 1/2018 |

OTHER PUBLICATIONS

International Search Report and Written Opinion of the International Searching Authority for PCT/US2015/017264 dated Sep. 2, 2015, 5 pages.

International Search Report and Written Opinion of the International Searching Authority for PCT/US2016/012513 dated May 30, 2016, 11 pages.

International Search Report and Written Opinion of the International Searching Authority for PCT/US2016/032161 dated Mar. 9, 2017, 11 pages.

3M Electronics, Product Information, "3M Novec 649 Engineered Fluid", Sep. 9, 2009, 4 pages.

Kilgore et al., "Energy Storage at Site Permits Use of Large Excavators on Small Power Systems", Westinghouse Engineer, Nov. 1970, vol. 30, No. 6, pp. 162-167.

Limpaecher et al., "Resonant Link PFN Charger and Modular Power Supply", Science Application International Corporation Electrical Power Technology Division, IEEE, 2007, pp. 1495-1499.

Moore et al., "Design and Performance Characteristics of Gas/Vapor Transformers", Trans. IEEE Power Apparatus & Systems, vol. PAS-101, Jul. 1982, 4 pages.

Narbut et al., "Vaporization Cooling for Power Transformers", Transaction of the AIEE Power Apparatus & Systems, Part III, Dec. 1959, 7 pages.

Strasik, "Flywheel Electricity Systems with Superconducting Bearings for Utility Applications", Boeing Phantom Works, Jul. 2004, 32 pages.

Walls, "Rotating machines for pulsed power", IEEE Xplore Abstract, Conference Record of the 25th International Symposium and 2002 High-voltage Workshop, Jun.-Jul. 2002, 8 pages.

* cited by examiner

SYSTEM AND METHOD FOR DAMPING OF TORSIONAL OSCILLATIONS IN LARGE INERTIAL ENERGY STORAGE SYSTEMS

GOVERNMENT LICENSE RIGHTS

This invention was made with government support under Contract No. HQ0727-16-D-0006 awarded by the United States Navy. The government has certain rights in the invention.

TECHNICAL FIELD

This disclosure is directed in general to control of power systems. More specifically, this disclosure relates to a system and method for damping of torsional oscillations in large inertial energy storage systems.

BACKGROUND

Typical inertial energy storage systems employing flywheels and rotating electrical machinery can often have torsional oscillations in either the charging mode or in the discharge mode. The most serious of these is the discharge mode when large blocks of energy are transferred from the storage system to the electrical load. If the load is a pulsating load such as a radar system, torsional oscillations can develop in the mechanical system which go undamped and can cause system instability or loss of synchronism. Some systems partially address this situation but fail to adequately handle both recurrent and non-recurrent load pulsations.

SUMMARY

This disclosure provides a system and method for damping of torsional oscillations in large inertial energy storage systems.

In a first embodiment, an energy storage system includes a power source configured to generate power. The energy storage system also includes an induction machine coupled to an inertial flywheel, the induction machine configured to receive electrical energy from the power source, store or extract the energy in the flywheel, and deliver a first portion of the energy to a first pulsed load. The energy storage system further includes a damping network configured to receive and absorb a second portion of the energy at a controlled rate to regulate torsional oscillations in a rotary motion of the flywheel caused by load swings or pulsations of the first pulsed load.

In a second embodiment, an energy storage system includes a power source configured to generate AC power. The energy storage system also includes a triply-fed wound-rotor induction machine coupled to an inertial flywheel and comprising multiple stator ports and at least one rotor port, the triply-fed induction machine configured to receive or modulate energy from the power source, store or extract the energy in the flywheel, and deliver a first portion of the energy to a first pulsed load. The energy storage system further includes a damping network configured to receive a second portion of the energy at a torsional damping voltage to regulate oscillations in a rotation speed of the flywheel caused by load swings or pulsations of the first pulsed load.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
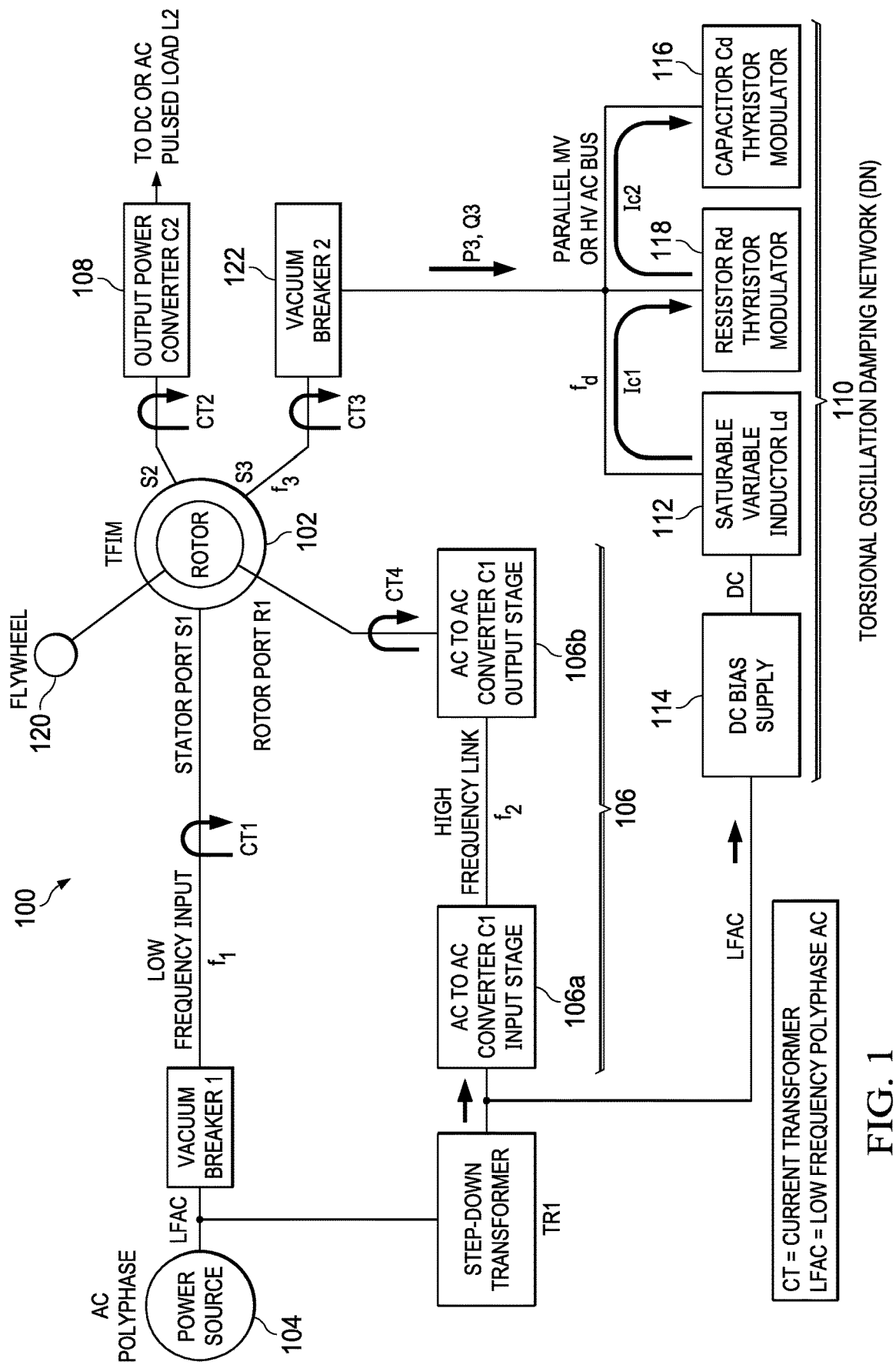
FIG. 1 illustrates an example energy storage system with damping network according to this disclosure.

The figures described below and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

It will be understood that embodiments of this disclosure may include any one, more than one, or all of the features described here. Also, embodiments of this disclosure may additionally or alternatively include other features not listed here. For example, the disclosed embodiments may include one or more features described in U.S. Pat. Nos. 9,667,232 and 9,837,996, the contents of which are incorporated herein by reference. While the disclosed embodiments may be described with respect to power systems in certain applications, these embodiments are also applicable in any other suitable systems or applications.

Embodiments of this disclosure provide universal methods and systems for damping torsional oscillations in an inertial energy storage system to compensate for recurrent and non-recurrent load swings or rapid pulsations in delivered energy. The disclosed embodiments cover a broad range of load types which have differing electrical time constants and differing pulsing rates, as would typify an electromagnetic effector or a radar system. In some existing (and very elementary) compensation systems, the electrical time constants of the load are significantly smaller than the mechanical time constants of the flywheel-electrical machinery apparatus. In contrast, the disclosed embodiments compensate for torsional oscillation when the electrical time constant of the load is close to the mechanical time constants and when the electrical pulsing frequency is close to the mechanical resonant frequency. This is advantageous for applications involving large scale systems.

Some embodiments of this disclosure provide systems and methods for regulating the compensation apparatus speed range of operation of the flywheel-rotating machinery. In some particular embodiments, the system is a variable speed/variable energy system whereby the flywheel speed is varied from a lower limit speed such as 60% to a maximum base speed of 100% on a recurrent basis. Typically, each sequence or pulse of energy delivery extracts a partial amount $\Delta E$ of the total system stored energy $E_t$ on a recurrent basis every $\Delta T$ seconds. In one mode of operation, the storage system starts discharge operations at 100% energy/100% speed level and a sequence of N high level discharges are engaged, whereby the effective total energy extracted is $Ee=N \times \Delta E$. In this period of time, the machine speed will pass through a broad range of speeds, which may or may not include the principal (first) mechanical resonant speed. In many legacy inertial energy storage systems, the first resonant speed is within the operating range and the second resonant speed is above the maximum operating speed; this obviously imposes operational limitations. Embodiments of this disclosure operate to avoid any length of time of operation around the mechanical resonant speed since this can induce rotor vibration and eventual bearing failure. In addition to torsional rotor oscillations, there can also exist lateral mode vibrations or lateral rotational oscillations during a high energy pulse discharge cycle. The disclosed embodiments can also be used to apply damping to lateral shaft vibrations.

Embodiments of this disclosure alter the overall principal resonant speed by raising it above the maximum operating speed through the electrical machine interaction. Some embodiments utilize a triply-fed wound-rotor induction machine (TFIM) either directly coupled or indirectly coupled to an inertial flywheel. The TFIM has multiple stator winding ports for insertion or extraction of electrical power and energy to the machine system. For example, in some embodiments, the TFIM can include one stator port for input of power from a source such as turbine generator, and two stator output ports for a combination of energy delivery to a pulsating or steady load and a separate torsional compensation winding (TCW). Other embodiments utilize a doubly-fed wound-rotor induction machine (DFIM) either directly coupled or indirectly coupled to an inertial flywheel. The disclosed embodiments can be used in a wide variety of applications, including Naval ship power systems, which use a large energy storage module for operation of pulsed loads, such as railguns and lasers.

FIG. 1 illustrates an example energy storage system 100 with damping network according to this disclosure. As shown in FIG. 1, the energy storage system 100 includes a TFIM 102 with a TFIM stator port S1 being fed by an external power source 104. The external power source 104 is also connected to an AC-to-AC converter C1 106 (shown with separate input power stage 106a and output power stage 106b and a high frequency AC link at frequency f2), which produces excitation for the rotor circuit of the TFIM 102 at a frequency and power level different from the line frequency. The stator port S2 of the TFIM 102 is a polyphase machine output winding which has low electrical reactance and is designed to feed one or more pulsating or non-recurrent loads L2 through a separate output power converter C2 108, which may be an AC-to-AC or an AC-to-DC converter. The electrical load L2 has a characteristic surge impedance Zs, a pulsing frequency fp and optionally has an electrical resonant frequency fo.

The TFIM 102 includes a tertiary stator port S3, which is a torsional compensation winding, and is preferably a polyphase balanced winding feeding a vacuum breaker 122. The stator port S3 is loaded by an inductor/capacitor/resistor (L-C-R) torsional oscillation damping network 110 that includes high power passive components and an automatic or closed-loop means of regulation. By varying the resonant frequency and the magnitude and phase of the circulating current Ic in the damping network 110, the level and phase angle of power P3 and Q3 extracted from the TFIM 102 causes a change in the system overall mechanical resonant frequency.

The stator port S3 is capable of supplying both real P3 and reactive Q3 power to the damping network 110. In some embodiments, this power is at a different voltage level than either port S1 or port S2. In a preferred embodiment, the output voltage level of the port S3 is a higher voltage and lower current level than both port S1 and port S2, thereby allowing a reduction in size and cost of the overall machinery and converter scheme. The circulating current Ic in the damping network 110 is a complex current with phasor components $I_{dx}$ and $I_{qx}$. The output current I3 of the stator port S3 is also a complex current with phasor components $I_{d3}$ and $I_{q3}$.

FIG. 1 only shows one phase of a polyphase system. As shown in FIG. 1, the damping network 110 includes a number of components. A saturable polyphase inductor Ld 112 has the ability to vary inductance over a range of at least 60:1 and is controlled by an external DC bias power supply 114. A capacitor bank Cd 116 can include a shunt polyphase capacitor bank that is uncontrolled, and a shunt polyphase capacitor bank that is controlled in current magnitude by a bi-lateral thyristor T2. A resistance component Rd 118 can include a polyphase resistance bank in series with the polyphase inductor Ld 112 which has a shunt connected thyristor T1 to control the effective damper resistance thru regulating the current magnitude and phase angle through Rd.

A principal advantage of the energy storage system 100 is the ability to alter the resonant frequency of the damping network 110 over a range of at least 60:1 and to effect damping control within milliseconds of a command from the machinery control system later described herein. Further, the apparent power rating of the stator port winding S3 (expressed as P3+jQ3) can be a fraction of the apparent power rating of the output port S2 (P2+jQ2) or the input port power into S1 (P1+jQ1) resulting in a control scheme with a considerable power amplification factor. This configuration offers a basic advantage with proper component selection that the reactive power Q3 of the stator port S3 can balance or exceed the reactive power Q1 or Q2 of either the S1 or S2 ports individually or as a group as follows:

$$Q3 \geq Q1+Q2.$$

In a typical operating mode, power to the stator port S1 is OFF when the stator output port S2 is active; therefore a control mechanism can exist when the magnitude of Q3≥ the magnitude of Q2. If the input Q2 of the pulsed load converter C2 108 is inductive, then the compensation power Q3 may be capacitive and of the same magnitude but 180 degrees apart in phase angle. This enhances system dynamic stability. Conversely, if the input Q2 of the pulsed load converter C2 108 is highly capacitive, the compensation power Q3 may be regulated to be highly inductive including the case where the magnitude of Q3 exceeds the magnitude of Q2, thereby yielding a net lagging power factor. This provides for superior reactive compensation of a pulsed load when the power line source at the port S1 is disconnected and reduces unstable or oscillatory conditions for interactions with the energy stored in the flywheel 120.

In some embodiments, the energy storage system 100 includes an operating mode where the port S1 is used exclusively in a motoring mode for raising the speed of the flywheel 120 from zero to any intermediate speed or 100%, whereby torsional oscillations can exist even with the output ports operating at no-load conditions. This motoring mode (and its associated resonant mechanical speeds) is a simple mode to compensate for since resonant speeds or frequencies are predictable before a run-up mode starts.

In an inertial energy system with a wide speed range and wide energy storage operating range, there is a distinct advantage to having the net balance of reactive power within the electrical machine at a zero balance. Conversely, a highly capacitive load on the output terminal (without compensation) can lead to the electrical resonant frequency coinciding with the mechanical natural frequency and causing a larger system resonance or instability. Therefore embodiments of this disclosure include means to balance the electrical reactive power (within a set of machine windings on a common stator frame) to reduce the torsional oscillation power to near zero or alternately force the overall machine to be at a lagging power factor over a wide range of fundamental electrical frequencies while the discharge cycle is effective.

Figure 2:
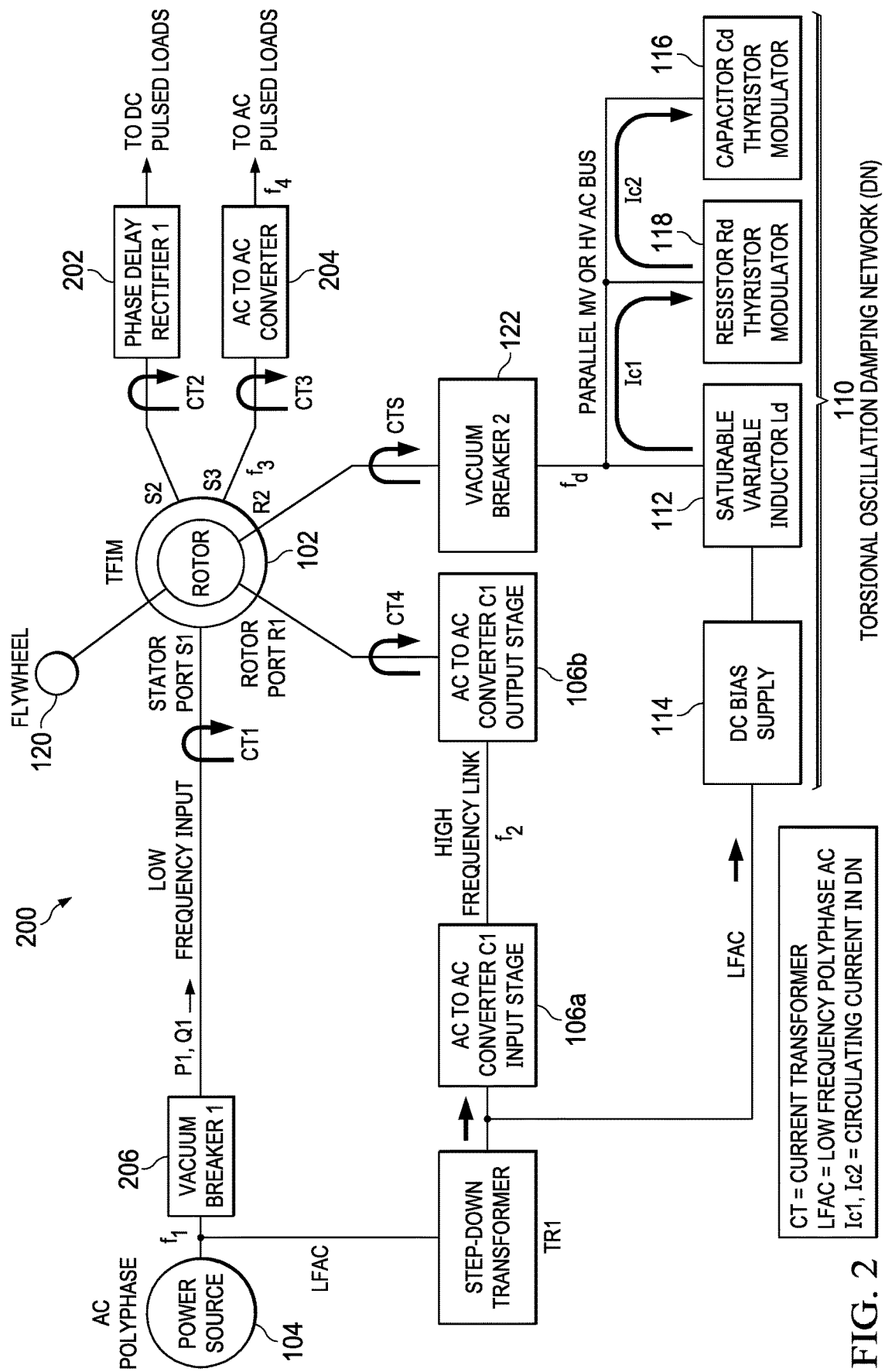
FIG. 2 illustrates another example energy storage system with damping network according to this disclosure.

FIG. 2 illustrates another example energy storage system 200 with a damping network and two rotor ports according to this disclosure. As shown in FIG. 2, the energy storage system 200 includes multiple components that are the same as or similar to those shown in FIG. 1. However, in FIG. 2, the stator ports S2 and S3 of the TFIM 102 have different pulsed loads. In the system 200, the port S2 feeds an AC-to-DC power converter 202, and the port S3 feeds an AC-to-AC power converter 204, which then supplies a pulsed, steady state, or non-recurrent load. Each port S2, S3 has by design a different electrical time constant and different voltage level. The input from the power source 104 enters at the stator port S1 through a vacuum breaker 206, which is a poly-phase AC input for powering up the TFIM-flywheel system. There is no power converter providing variable frequency input power to the stator port S1 since the rotor is brought up to base speed by a common technique known as "rotor slip frequency control," which works well with constant frequency input to the port S1, and requires that at least one rotor winding has a terminal short circuit.

One novel aspect of the system 200 is the use of two independent wound-rotor circuits at rotor ports R1 and R2, which are both fed by a polyphase slip-ring assembly. The winding at the rotor port R1 is a winding centered on the rotor direct (D) axis and normally provides power into the rotor. Conversely, the winding at the rotor port R2 is centered on the rotor quadrature (Q) magnetic axis and generates power (either reactive or real power) into the damping network 110. The damping network 110 may be the same or similar in its basic circuit to that described in FIG. 1, except the damping network 110 of FIG. 2 may operate over a lower principal frequency range. As such, the two secondary (rotor) windings at the ports R1 and R2 have minimal magnetic mutual coupling, which is a control advantage, yet both windings reflect their impedances into the primary windings to effect modification of system mechanical response.

The magneto-motive force (MMF) of the winding feeding the port R1 can be magnetizing MMF, and the MMF of the winding feeding the port R2 can be de-magnetizing MMF. The electrical frequency induced in the port R2 winding is always the same as the electrical frequency of the port R1 and thus varies inversely as the machine rotational speed varies. If the operating range of speed of the flywheel 120 is 60% to 100% of a base of 3600 rpm, the rotor frequency for a 2-pole 60 Hz (stator S1 input) machine will be 24.0 to 1.2 Hz for a 40% to 2% slip range. In practical terms, the MMF rating and physical mass of the port R2 winding is about one half to one fourth of the MMF rating and physical mass of the port R1 winding. Further, the combined action and power flow (electrical angle and magnitude) of the ports R1 and R2 inputs/outputs provide an effective means for torsional oscillation damping.

Referring to FIG. 2, the use of an isolated secondary rotor winding R2 for a triply-fed induction machine provides variable L-C-R damping characteristics and the ability to change the system input power factor (as reflected on the line side winding Port S1) from capacitive to lagging power factor to create a power level response in opposition to observed oscillations of machine torque or speed. Conventional flywheel machine systems can induce extra and unwanted torsional vibrations, due to the electrical machine input factor being too highly capacitive. The embodiments disclosed herein solve this problem by having a controllable negative and positive VAR capability available at the machine input terminals, and in particular can reflect a balanced inductive-resistive power factor onto the incoming power source line to raise the system natural frequency above typical operating frequencies.

Therefore one objective of the embodiments of this disclosure is to raise the first and second critical mechanical speeds above the lowest operating shaft speed. A second objective is to impose (from two different means) a highly responsive dynamic braking electrical damping torque on the machine when flywheel torque or shaft speed oscillations arise, and in doing so, reduce or eliminate oscillations. A third objective is to lower the machine's input electrical impedance (by use and electromagnetic reflection of the damping network) to be lower than in conventional rotating machinery of the same power rating; a lower input impedance fundamentally reduces the magnitude of torque or speed oscillations when machines interact with the overall electrical power system or prime mover.

Referring again to FIG. 1, a second means of providing torsional oscillation compensation is to regulate the resistor Rd 118 and ensure that the principal component current of the damping network 110 is the resistive component, and $I_{dx} > I_{qx}$ and to reflect this resistance component into the machine windings at the port S3. The vacuum breaker 122 connects the damping network 110 to the machine windings when the damping is required; the vacuum breaker 122 has a fast response time of 2 ms. This consequently appears as a resistive damper on the output windings at the port S2, or alternately (where the S2 load is low or non-existent) this damping effect through the port S3 directly reduces the overall mechanical torsional oscillations in magnitude and raises the characteristic mechanical frequency. This is accomplished because the current through the port S3 provides real power to the resistor Rd 118, which presents a controllable and fast response braking torque on the TFIM 102.

The machine stator port S3 winding has a small L/R time constant of T3 consisting of its internal transient inductance Ld' and internal winding resistance R3' which in a full scale machine may amount to T3 being approximately 20 ms. By adding in Rd to this circuit with Ld=0 (by control), the effective L/R electrical time constant on the port S3 becomes much smaller (e.g., Tx=2 ms). This time constant Tx of 2 ms can be much faster than the typical mechanical time constant of the combined flywheel/electrical machine, which can be in range of 50-250 ms. Therefore, small bursts of resistive damping current cycled, e.g., every 6×Tx seconds through a controllable braking torque can be provided with a bandwidth in the kilohertz range. The master control system, when it detects a speed oscillation of frequency $f_o$, then signals the damping network to regulate real and reactive power independently since each L-C-R component has separate switching controls.

Figure 3:
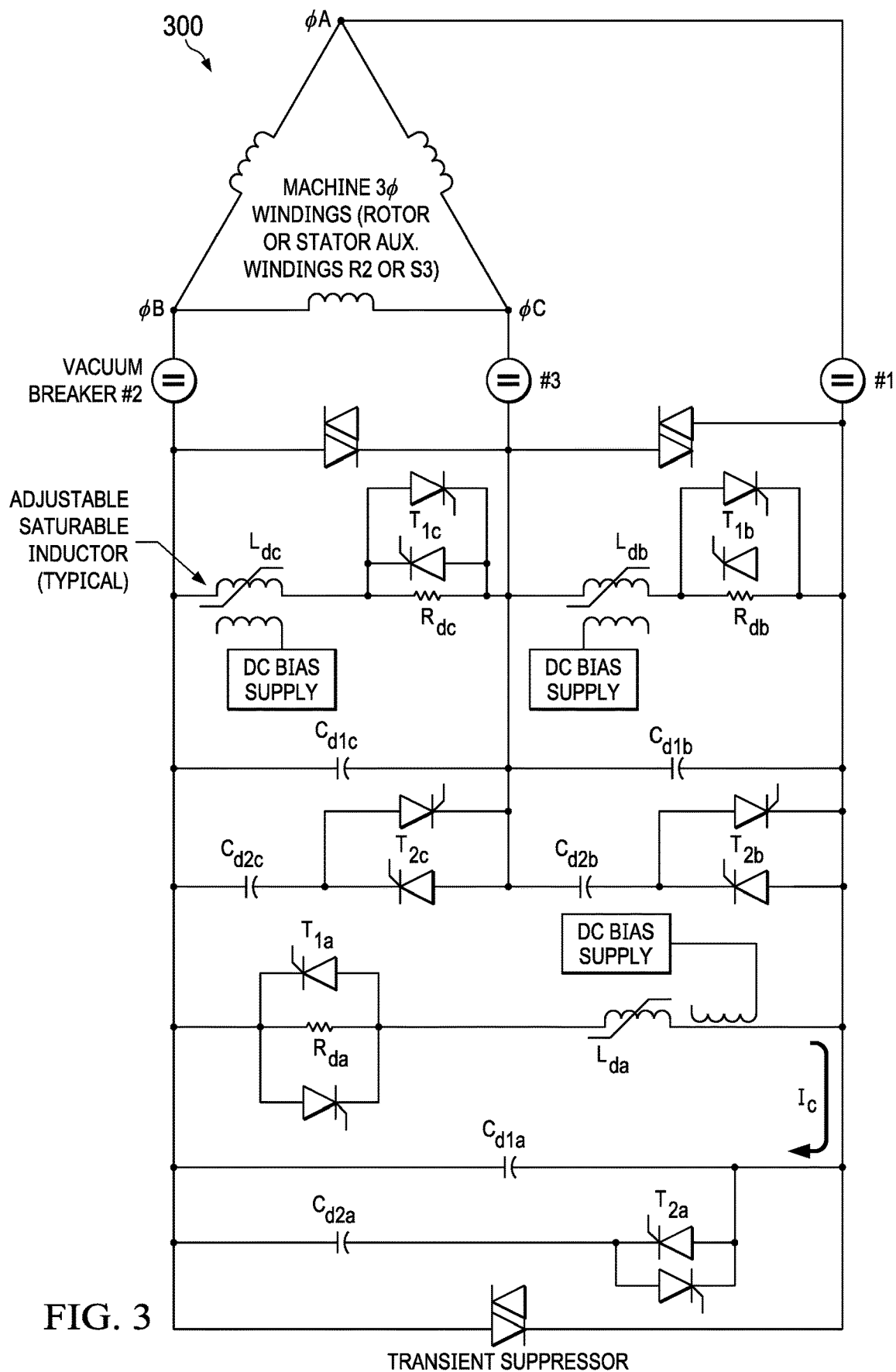
FIG. 3 illustrates a detailed schematic view of an example L-C-R damping circuit according to this disclosure.

FIG. 3 illustrates a detailed schematic view of an example L-C-R damping circuit 300 according to this disclosure. The damping circuit 300 may represent (or be represented by) the damping network 110 and may be applied to either FIG. 1, FIG. 2, or FIG. 7 with variations in actual component values. In general, such a damping circuit is a torsional oscillation damping circuit, and may be applied to either the stator port S3 or the rotor port R2 of FIG. 1 or FIG. 2.

As shown in FIG. 3, the damping circuit 300 is a rotor special auxiliary circuit with a high power adjustable RLC circuit for tuning of the electrical damping of the torsional oscillations. The damping circuit 300 may also be used as an auxiliary isolated stator winding. The damping circuit 300 includes multiple thyristors, which are bilateral devices, and multiple saturable inductors, which are DC bias controlled. The damping circuit 300 provides both real (kW) and reactive (kVAR) power damping characteristics impressed on the AC line input. In conjunction with the rotor frequency excitation controller 106b, the machine's terminal impedance can be adjusted to be negative or positive impedance. Thus, the damping circuit 300 is applicable to a wide range of ship power systems.

Figure 4:
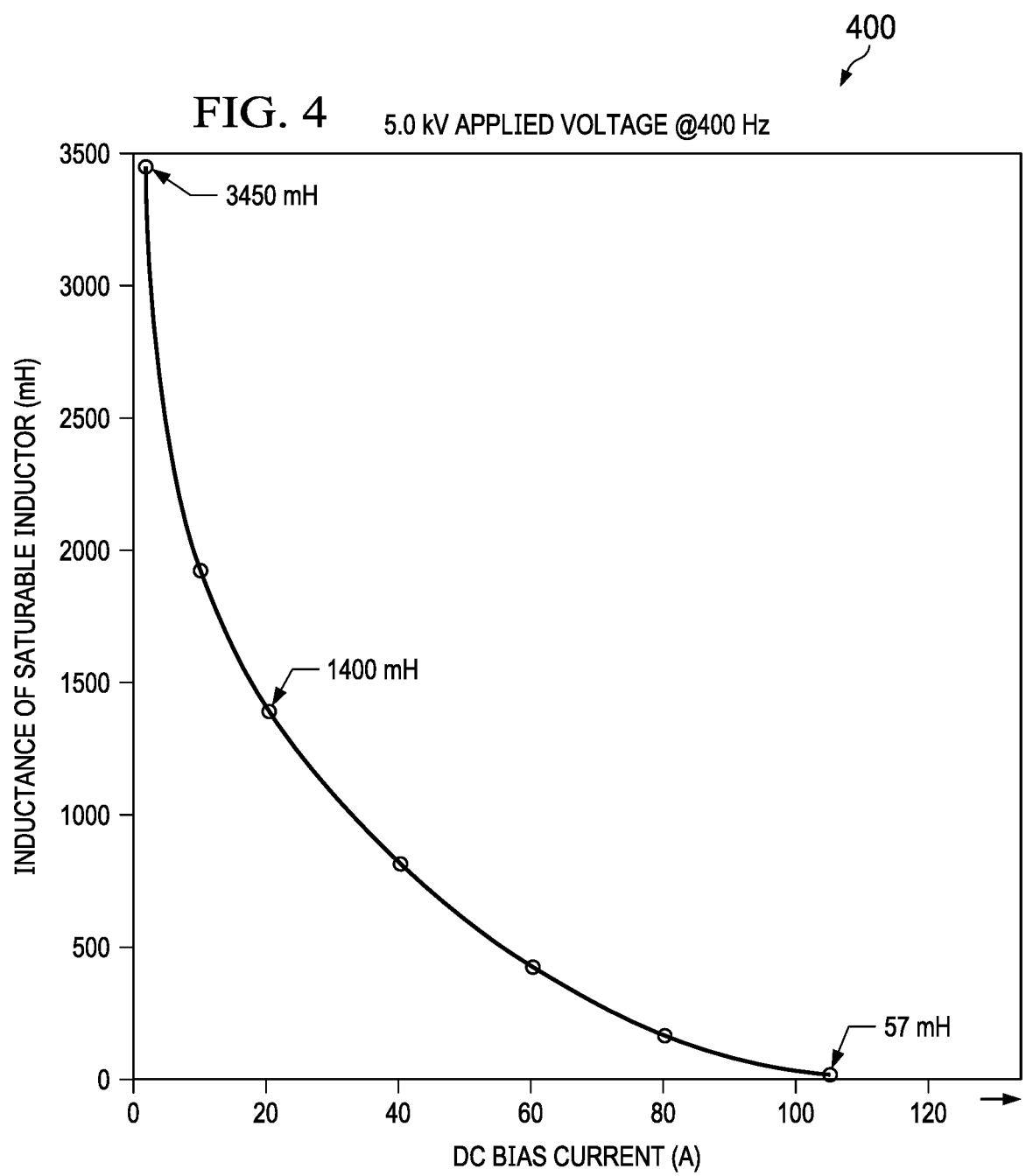
FIG. 4 is a chart that illustrates test results of a saturable 3-phase 5 kV inductor according to this disclosure.

FIG. 4 is a chart 400 that illustrates test results of a saturable 3-phase 5 kV inductor according to this disclosure. The inductor tested in FIG. 4 may be the polyphase inductor Ld 112 of the damping network 110 shown in FIGS. 1, 2, and 7. The inductor has a 60:1 inductance range and is quickly controlled by a variable DC source of 0-110 Amps. Test results were obtained with a 400 Hz 5.0 kV rms single-phase supply. Three-phase saturable reactors with controllable DC bias on the magnetic core are known in the art. At 2 amps DC bias on the magnetic core, the inductance per phase is 3.450 H; while at 20 Amps the inductance lowers to 1.40 H and further at 110 Amps DC bias the inductance per phase is 57 mH. The resistance of the Rd-T1 combination at varying gating levels for the thyristor T1 changes starting at 2 Ohms and rises to 120 Ohms; thus a range of 60:1 is also possible. The L-R sub-circuit combination is operated in shunt with the two capacitor stages. In some embodiments, the damping network capacitor stage includes a combination of a fixed capacitor Cd1 and controllable capacitor Cd2. Of course, multiple stages of controllable capacitor-thyristor networks are possible to yield finer control.

Figure 5:
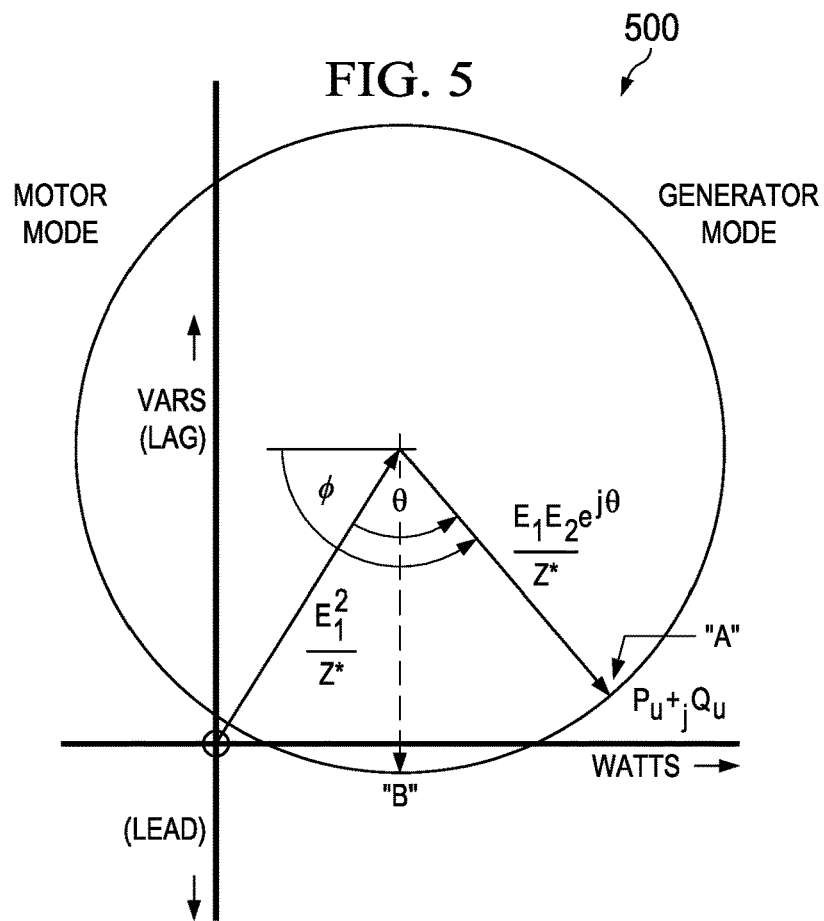
FIG. 5 is a circle diagram that illustrates the range of operation of real and reactive power from a damping network according to this disclosure.

FIG. 5 is a circle diagram 500 that illustrates the range of operation of real and reactive power from a damping network according to this disclosure. The damping characteristic of FIG. 5 may represent the damping network 110 of FIGS. 1, 2, and 7. In FIG. 5, the damping network is configured with a DFIM machine internal reactance Xl and any distribution line reactance Xt, if significant. The total complex impedance of the damping network is R+jXd with capacitor branch off. Let the combination of internal and external reactances be X=Xl+Xt+Xd. Let the internal voltage per phase of the stator damping winding R2 be E1. The voltage across the damping resistor Rd is defined as E2, when the thyristor T1 is OFF.

The electromagnetic torque $T_{em}$ exerted on the flywheel is by conventional theory:

$$T_{em} = E1*E2*\sin\Theta/\omega X \qquad (1)$$

where $\Theta$ is the electrical angle between the internal voltage E1 and the voltage E2 on the damping resistor Rd and $\omega$ is the mechanical angular velocity in radians/sec. FIG. 5 shows the arrow head "A" for the quantity Pu+jQu at a value of 1.0+j0.166, where Q is lagging VARs and P is real power in watts. The reactive power Q is an inductive load overall and this is beneficial for damping rotor oscillations.

The electromechanical torque developed by the combination of power output/input windings plus the damping winding S3 is also equal to the mechanical oscillation equation as:

$$T_{em} = -J\,d^2\Theta/dt^2 \qquad (2)$$

where J is the moment of inertia of the entire flywheel-machine set. Upon certain conditions such as a regenerative load, Ts2 and Ts3 can be both positive and add to the motoring torque Ts1, which causes the flywheel to overspeed until the controller opens the input vacuum breaker 206.

The torque $T_{em}$ is composed of three terms:

$$T_{em} = Ts1 + Ts2 + Ts3 \qquad (3)$$

where Ts1 is the torque component from winding S1, Ts2 is the torque component from winding S2, and Ts3 is the torque component from winding S3. When the TFIM is in the generating (discharge) mode, Ts1=0. The nature of Ts2 depends on the load circuit and duty cycle; this may be a stochastic load or Ts2 may be a periodic function.

FIG. 5 also shows another operating mode depicted by the arrow "B." The arrow shows the quantity P+jQ at a value of 0.50−j0.09. This indicates a positive real power dissipated in Rd but the VARs (Q) are negative or leading power factor indicating that the combination of the damping network and the load are capacitive. Certain pulsed loads, including static switched-mode power converters, often have a capacitive input impedance; this is to be avoided for stable operation without possibility of rotor torsional oscillations.

Therefore the most basic compensation scheme has the damping network operating at a lagging power factor as shown in FIG. 5 by operating point "A". If the load is highly inductive at port S2, then it is advantageous to operate the damping network with capacitor Cd2 energized but modulated by the thyristor T2. Further means are provided whereby the control system provides a combination of simultaneous real power damping and reactive damping as follows:

1. Controllable DC Bias to Ld responds to requirements for compensating the load converter power factor when capacitive Q2 is large and at a fast time constant Tx1.

2. Controllable resistive element Rd responds to requirements for mechanical damping of flywheel torsional oscillations at a slower time constant Tx2.

The period of oscillation is given by conventional theory as $$T=2\pi*SQRT(M*X/E1*E2) \quad (4)$$

where M is the inertia constant of the TFIM=H/180*f and H is the energy storage of the flywheel in megawatt seconds/MVA rating of the electrical machine.

Therefore as seen in Equation (4), if the total reactance X is increased, the period of oscillation will increase, i.e., the torsional frequency is lowered. This is usually not desirable. Conversely, if the X reactance parameter is decreased by varying the DC bias (i.e., higher DC bias current) on the saturable reactor Ld, the oscillation period decreases and the torsional center-point oscillation frequency increases, which is an objective of this disclosure.

Referring again to FIG. 1, the embodiment of FIG. 1 shows the AC-to-AC converter C1 106 with an intermediate AC link and providing variable-voltage variable-frequency power to the rotor excitation port R1. This type of basic rotor control for a doubly-fed induction machine is known in the art. However, the combination of a tertiary stator winding S3 output with a rotor excitation at the port R1 to modulate the TFIM electrical machine's total airgap magneto-motive force in both real and reactive power is novel. Rotor currents through the port R1 provide an amplification effect in that stator power directed to either port S2 or S3 can be controlled to a large extent by the phase, magnitude, and frequency of the R1 port power input. The converter C1 106 provides a frequency to the port R1, which is typically a fraction of the stator line input frequency to the port S1 based upon the machine speed. One objective of the control system when in discharge mode is to inversely track the rotor frequency fr with actual machine mechanical frequency fm as it varies to allow the output frequency f3 to remain high and nearly constant as follows: fr+fm=f3. Thus as the machine speed falls, the rotor frequency is boosted, and f3 can remain constant or increase.

In a torsional oscillation the mechanical frequency will vary as fm"=fm+δfm. The rotor controlled frequency is thereby regulated to have a response fr"=fr+δfr with a 180 degree phase shift. The mechanical power derived from the oscillation creates a power component $P_{osc}=\omega T$ which is offset by polyphase braking power developed in the resistor Rd 118. In the energy storage system 100 of FIG. 1, the real power developed in the port S3 can act simultaneously with the rotor electrical input power into the port R1, which controls the output frequency at the port S2 and yields a rotor active-control speed perturbation signal for counteracting speed oscillations.

Figure 6:
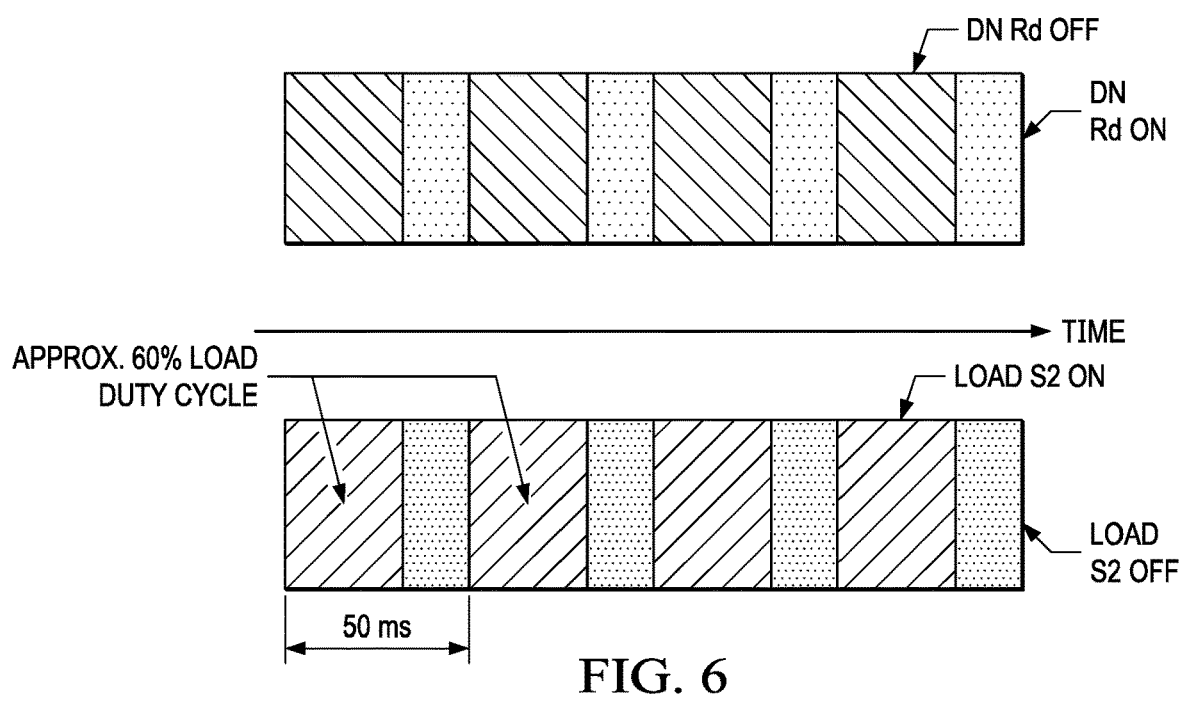
FIG. 6 shows operation of a resistive mode of the damping network of FIG. 1 to be in phase opposition with a pulsed load, according to this disclosure.

In some embodiments, the damping network 110 is used to counteract the pulsed load on a repetitive basis. For example, FIG. 6 shows operation of the Rd resistive mode of the damping network 110 to be in phase opposition with the pulsed load at the port S2, according to this disclosure. Such an arrangement creates an overall constant-magnitude machine real power load and a constant machine torque from the flywheel 120. In a simple case shown in FIG. 6, the load converter takes an input power and current which is a 60/40 duty cycle square wave with, e.g., a 50 ms cycle time. The damping network 110 is controlled to create an opposing pulse and opposing power so the TFIM 102 sees a fixed combined load with the ports S2, S3. This in itself reduces or eliminates the conditions creating torsional oscillations as the flywheel discharge cycle is monotonic and without speed harmonics. In addition to real power compensation, the damping network 110 provides reactive power compensation of the converter C2 108 so the DFIM has a net zero reactive power modulation. This increases system dynamic stability.

Figure 7:
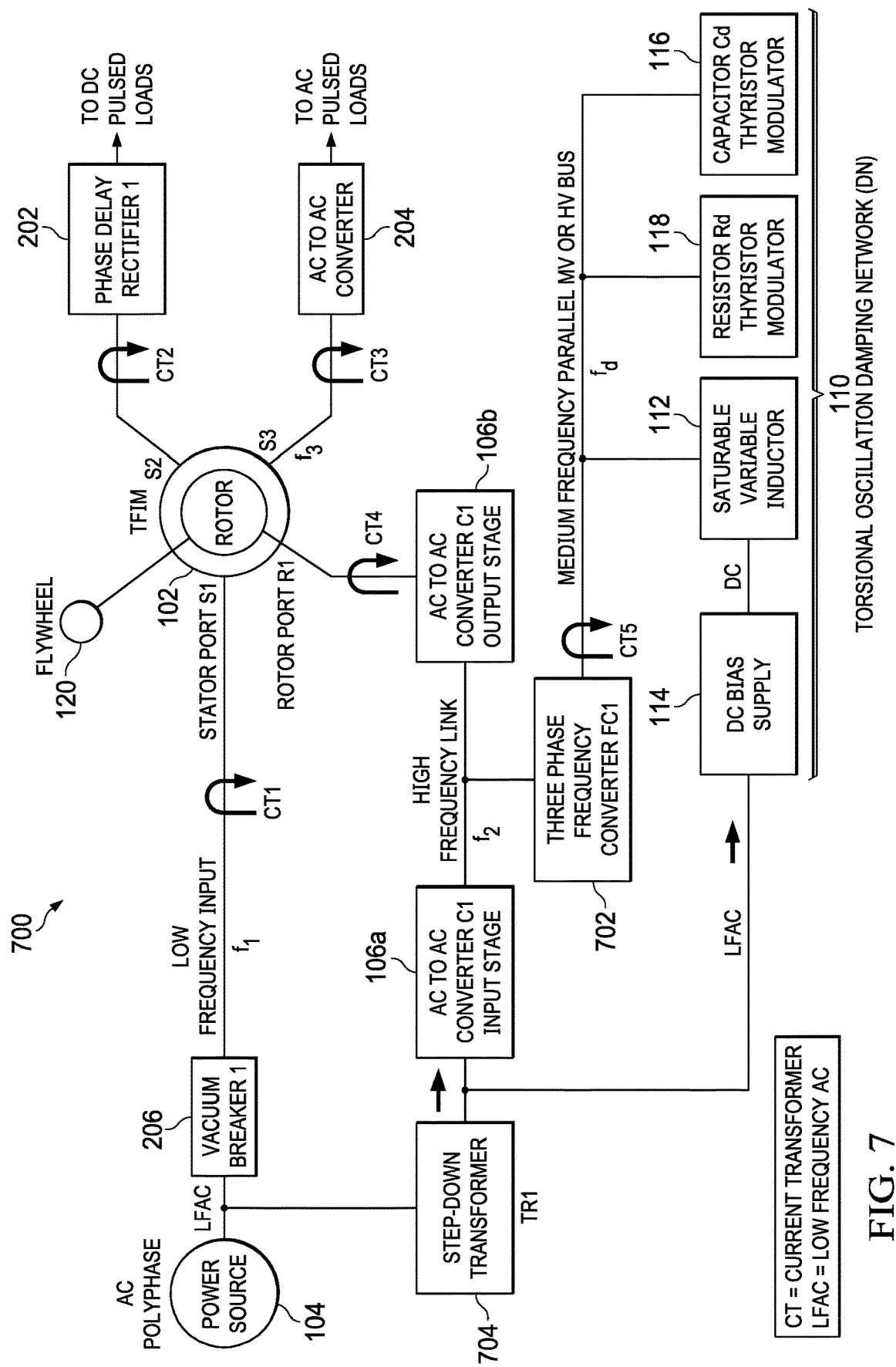
FIG. 7 illustrates another example energy storage system with damping network on a singular rotor port according to this disclosure.

FIG. 7 illustrates another example energy storage system 700 with a damping network on a singular rotor port according to this disclosure. As shown in FIG. 7, the energy storage system 700 includes multiple components that are the same as or similar to those shown in FIGS. 1 and 2. However, in FIG. 7, the damping network 110 is electrically connected into the high frequency link between the input rotor excitation power stage 106a and the output rotor excitation power stage 106b of the AC-to-AC converter C1 106 operating at frequency f2. This simplifies electrical machine construction or allows for the second output port S3 to be a load port at frequency f3. A frequency converter 702 changes the link frequency from f2 (which may be as high as 30 kHz and constant) to a lower and variable frequency fd, such as 300-3000 Hz. This high frequency link provides a compact and high density power conversion.

In some embodiments, the TFIM 102 includes stator windings that are centered on different magnetic axes. For example, the stator port S2 winding can be centered on the machine's direct (D) axis and the stator port S3 can be centered on the machine's quadrature (Q) axis, the two axes being 90 electrical degrees apart. The TFIM 102 then can have the stator input port S1 winding centered on the D axis. There are clear advantages to having the three stator windings at different voltage levels and three different impedance or base power (MVA) levels plus an independent rotor port voltage, as shown in the following example:

Port S1 at 5000 Volts, 3 phase and base impedance=15 Ohms;

Port S2 at 10,000 Volts, 6 phase and base impedance=50 Ohms, then rectified;

Port S3 at 15,000 Volts, 3 phase and base impedance=400 Ohms;

Port R1 at 1000 Volts, 3 phase and base impedance=75 ohms.

Thus the compensating network, if positioned at the stator port S3, operates at the highest voltage level and the highest impedance level, since it is not restricted by the particulars of the load voltage level or input power sources. This allows for a highly compact and efficient damping network. Thyristor switching technology is available at the 15 kV level. The rotor port R1 is the lowest voltage port since this power is often transferred through rotating slip rings where high voltages are prohibited.

A polyphase step-down transformer 704 lowers the incoming line voltage from the main power source 104 to a level that requires minimal voltage adjustment from the AC-to-AC converter C1 106 to feed the rotor circuit. The AC-to-AC converter C1 106 can control (through phase angle delay) the reactive power at its output terminal into the rotor port R1 to ensure that the rotor circuit power factor is high (e.g., 90% or greater), in addition to offering close frequency control of the rotor to inversely match the speed variations of the rotor.

As discussed earlier, the AC-to-AC converter C1 106 is a bidirectional "AC Link" converter, which can provide negative or positive real power to the rotor circuit to provide for either sub-synchronous or super-synchronous operation. One example of this operation is when the load circuit at the port S2 suddenly loses load, the rotor will tend to overspeed, and this can be controlled by forcing the C1 frequency imparted to the rotor to be lower (causing super-synchronous operation) and/or causing the damping network 110 to go highly resistive and provide braking torque.

Figure 8:
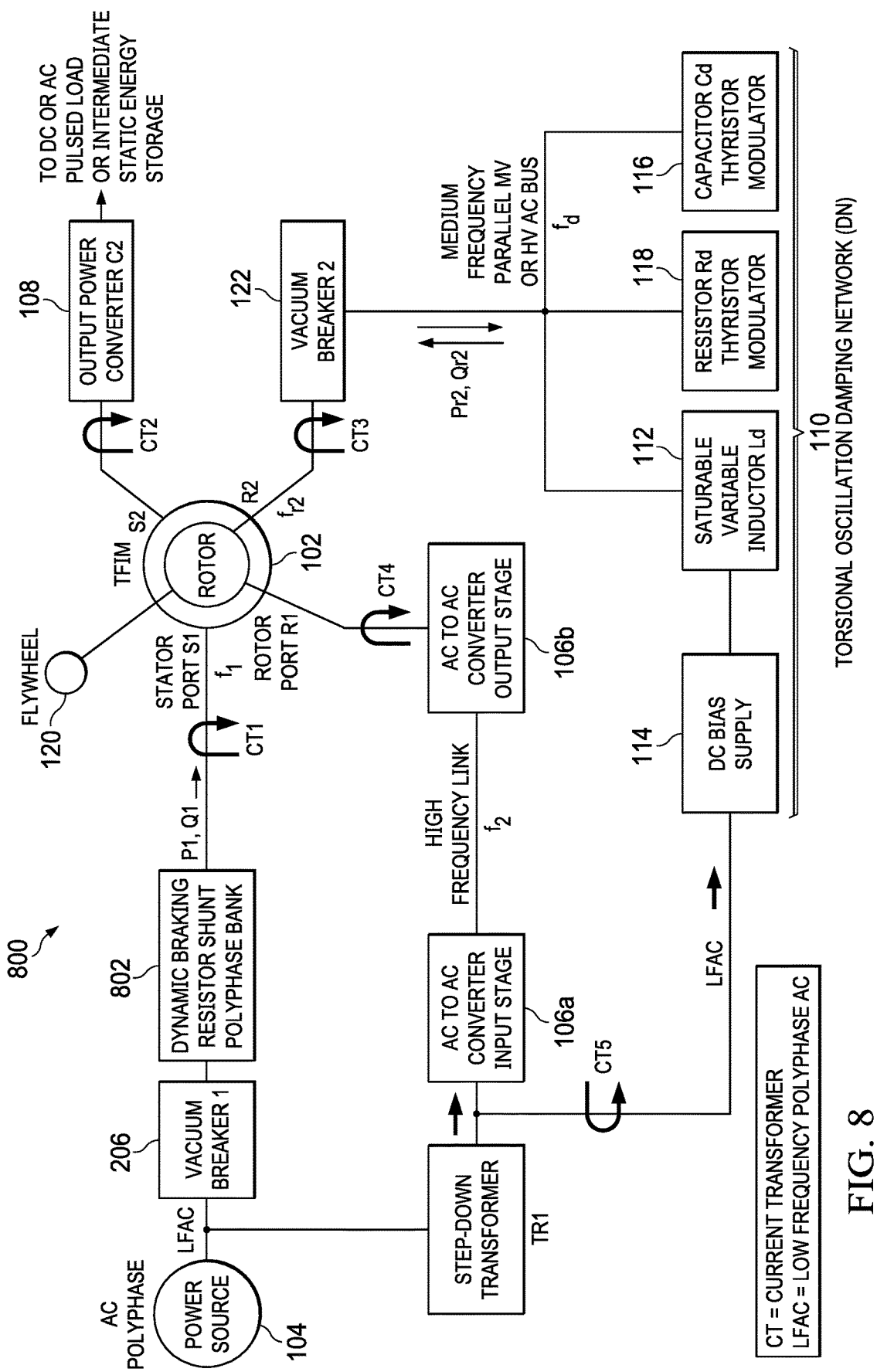
FIG. 8 illustrates an example energy storage system with a dual stage torsional oscillation damper employing a combination of stator and rotor damping, according to this disclosure.

FIG. 8 illustrates an example energy storage system 800 with a dual stage torsional oscillation damper employing a combination of stator and rotor damping, according to this disclosure. As shown in FIG. 8, the energy storage system 800 includes multiple components that are the same as or similar to those shown in FIGS. 1 and 2. However, in FIG. 8, the stator port S1 of the TFIM 102 is coupled to a resistor bank 802. The resistor bank 802 is a polyphase set of dynamic braking resistors R1 arranged in delta, which are connected in parallel across the windings. The resistors in each phase are controlled by a set of series connected thyristor or similar bilateral switches TS1 which are OFF when the TFIM 102 is in a motoring or charging mode. When the TFIM 102 is in the discharge mode and the vacuum breaker 206 on the incoming line is open, if the speed controller detects a torsional oscillation, the thyristor switches are commanded to close or conduct in a phase-back mode to cause current $I_{db}$ flow in the resistor bank 802 and the stator port S1 windings, thereby producing a direct-axis braking torque on the TFIM 102. The buildup of current $I_{db}$ and braking torque is fast and an order of magnitude smaller than the mechanical time constant since the L/R time constant of the electrical circuit is short (e.g., ≤2 ms) due to the resistor insertion.

The main machine magnetic flux (MMF) to induce voltage in the stator port S1 windings is provided by a combination of the main rotor excitation to the port R1 and the optional use of the rotor winding at the port R2, which is connected to the damping network 110. Although outside of normal operating practice, to utilize the damping network 110 to boost machine rotor MMF excitation, the damping network 110 is operated with maximum capacitive current load and minimum inductive current, thereby producing a net leading power factor load on the port R2 winding. In the event that the main excitation supply line from the main power source 104 is not available, the damping network 110 in its capacitive mode is now used to self-excite the TFIM 102 and render a significant controllable braking torque for torsional oscillation damping. In some embodiments, control for the thyristor or IGBT switches TS1 is provided using a pulse width modulation (PWM) scheme, as the switching devices can be turned ON typically within a 1 microsecond period and a typical machine L/R time constant for the dynamic braking circuit is 200-500 microseconds to control a mechanical system with a 20 ms or larger time constant. When self-excitation occurs, the transformer TR1 carries no power, and magnetization of the machine is supplied strictly by the capacitance in the damping network 110.

Figure 9:
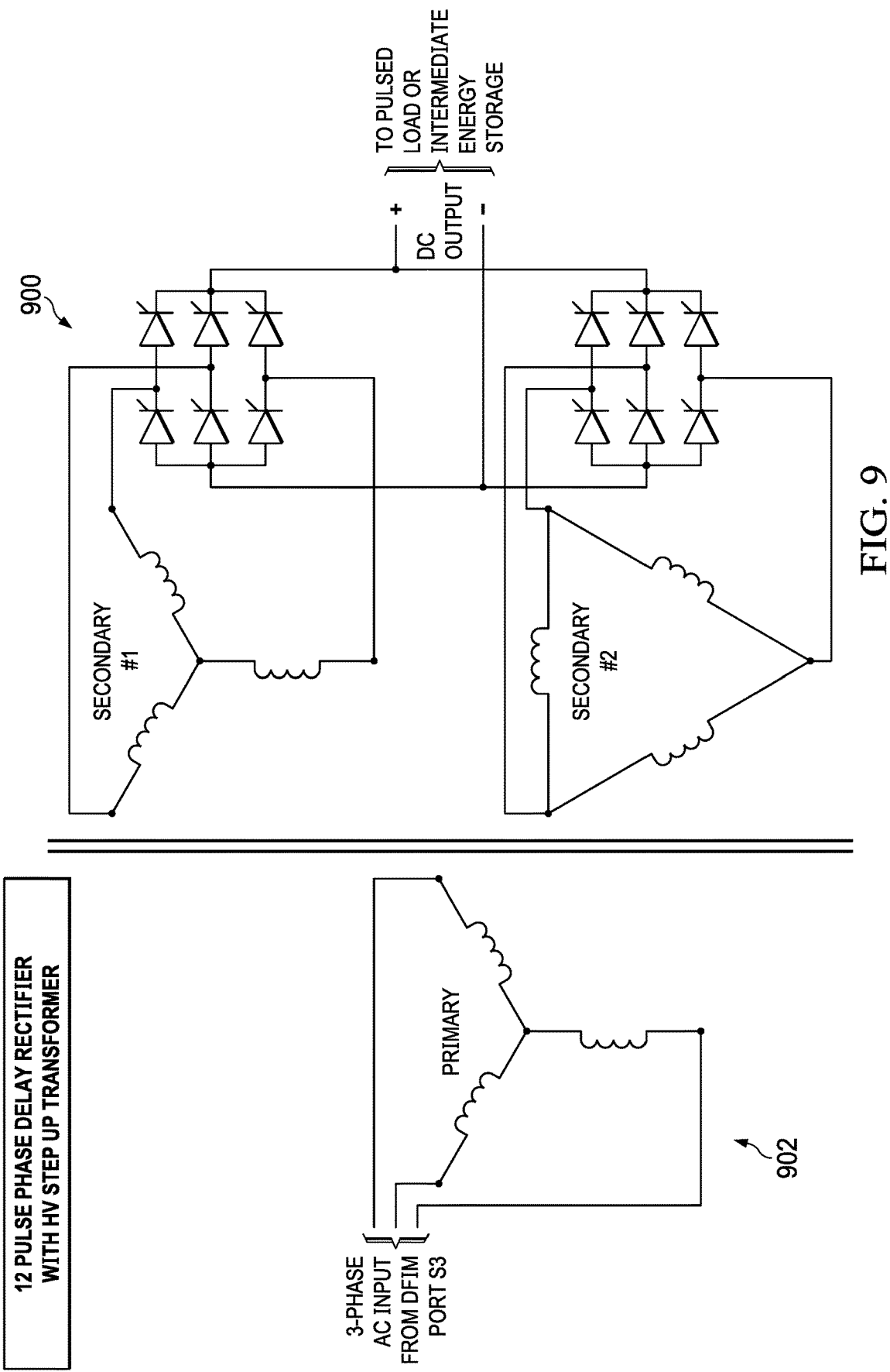
FIG. 9 illustrates an example of a standard thyristor rectifier according to this disclosure.

FIG. 9 illustrates an example of a standard thyristor rectifier 900 according to this disclosure. The rectifier 900 is a 12 pulse phase delay rectifier (PDR) that includes a high voltage step-up transformer. The rectifier 900 can be used for an output load converter, allowing for high voltage step-up and use of DC in loads.

As shown in FIG. 9, the rectifier 900 includes a wye-delta 3-phase input 902 with a 12-pulse PDR converter. For example, if the electrical machine output voltage is 14,800 Volts AC, after rectification this voltage is controllable within the range of 100-20,000 VDC. The switching power supply then converts this 20 kVDC power into a constant-current or constant-power DC output to charge the intermediate energy storage in at least two different types of charging modes. The pulsed load may be an electromagnetic effector or radar with principally capacitive-resistive input impedance but also inductive-resistive loads are common. The pulsed load may have a PWM waveform of input current and power. The transformer in FIG. 9 may also be configured as a zig-zag transformer to yield, e.g., a 15-phase 30-pulse system to reduce output harmonics.

Figure 10:
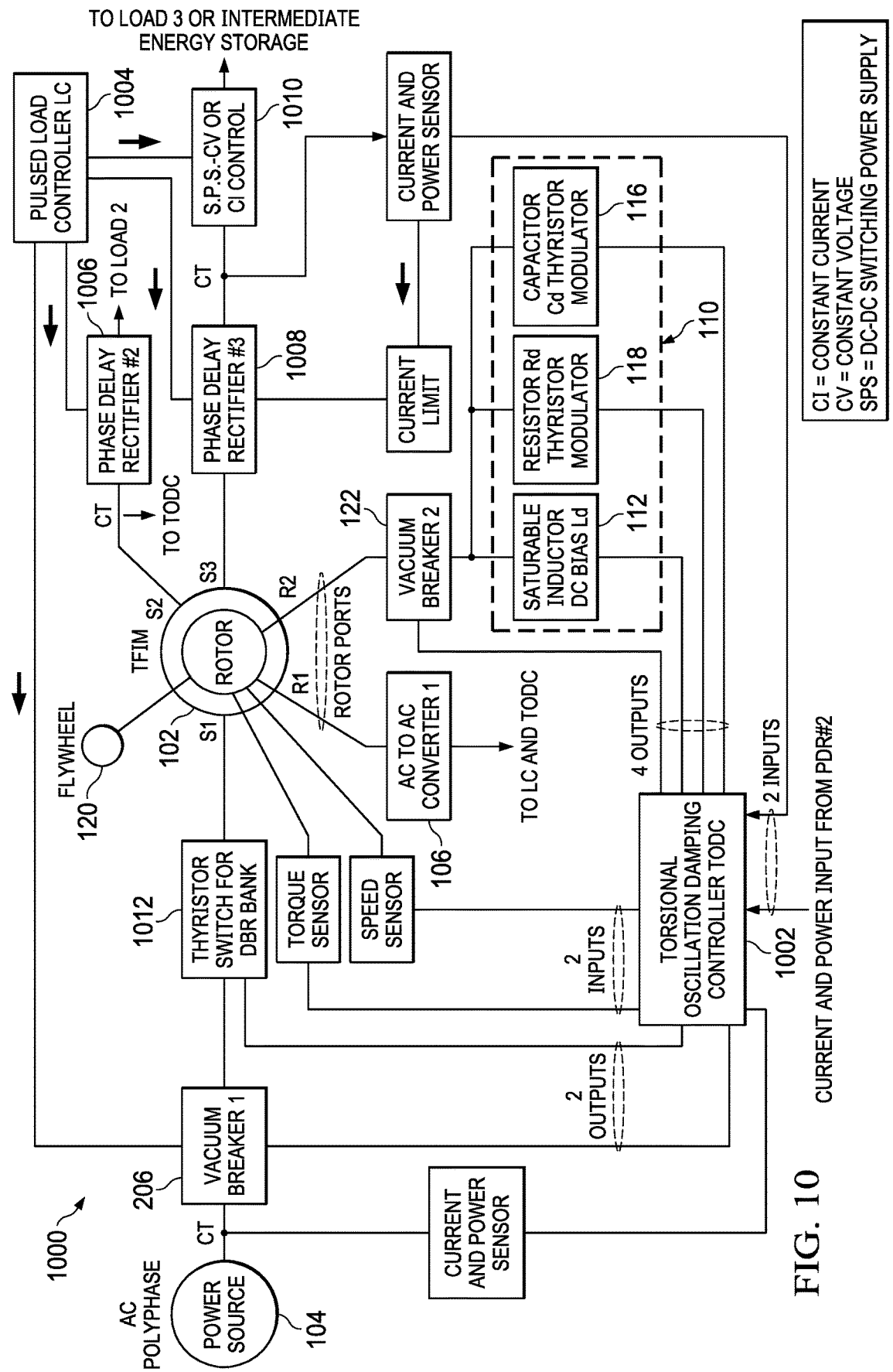
FIG. 10 illustrates use of a master control system in an example energy storage system with two rotor ports according to this disclosure.

FIG. 10 illustrates use of a master control system in an example energy storage system 1000 with two rotor ports according to this disclosure. As shown in FIG. 10, the energy storage system 1000 includes multiple components that are the same as or similar to those shown in earlier figures, such as FIG. 2.

FIG. 10 shows a further refinement to the load circuit of FIG. 2 for stator port S3, whereby the output converter is a phase delay rectifier 1008 with controllable DC output connected to a DC-to-DC switching power supply (SPS) 1010, then to an intermediate energy storage module (IES) and a final pulsed load No. 3. The IES module may be an ultra-capacitor bank or an electrochemical battery system. The TFIM output at port S3 is preferably a multiphase output (e.g., 6, 9 or 12 phases) to aid in rectification efficiency; the output of the phase delay rectifier 1008 is typically a high voltage DC output.

The energy storage system 1000 includes a master control system with several methods of torsional oscillation mitigation. The system includes two electronic controllers: a torsional oscillation damping controller (TODC) 1002 and a load controller 1004. Both may use a high-speed digital signal processor (DSP) for processing of input signals, converting to D/Q-axis quantities, solving the state space equations, and commanding auxiliary circuits for effecting control of output devices.

The inputs to the TODC 1002 can include:
Flywheel to TFIM torque load;
Flywheel or TFIM shaft speed;
Main power source current, voltage, and power;
Current, voltage, and power input from the phase delay rectifier 1006 for load 2;
Current, voltage, and power input from the phase delay rectifier 1008 for load 3; and
Analog signal from the AC-to-AC converter 106 for converter output current and power to the port R1.

The outputs from the TODC 1002 can include:
Command digital signal for opening vacuum breaker 206 from the power source 104 to TFIM input port 1;
Command analog signal for gating of thyristor switches to connect dynamic braking resistors at the TFIM port S1;
Digital signal to open the vacuum breaker 122 at the port R2 to interrupt the current of the damping network 110;
Analog signal to control DC current bias level to the damping saturable inductor Ld 112;
PWM digital signal to thyristor switch on the damping resistor Rd 118; and
PWM digital signal to thyristor switch on the damping capacitor Cd 116.

The inputs to the load controller 1004 can include:
Input current and power at the port S1;
Input current and power at the port S2;
Input current and power at the port S3;
Input current and power at the port R1;
Input current and power at the port R2;
Flywheel shaft speed;
Flywheel to TFIM mechanical torque from the load cell;
Energy and voltage level of the intermediate energy storage module;
Output voltage and current level of the phase delay rectifier 1006; and
Output voltage and current level of the phase delay rectifier 1008.

The outputs from the load controller 1004 can include:
- Digital signal for opening the vacuum breaker 206 from the power source 104 to the TFIM input port 1;
- Analog signal for controlling phase delay rectifier 1006 output DC level;
- Analog signal for controlling phase delay rectifier 1008 output DC level;
- Digital signal for controlling output of the SPS 1010;
- Digital signal for controlling output of the AC Link Converter 106 for TFIM excitation at the port R1; and
- Protective stop function to the power source operator.

In some embodiments, the method of control for the TODC 1002 is a state-space solution of the system equations for the TFIM performance where all currents and voltages for the five ports are expressed in direct and quadrature axis quantities. In the system 1000, all input 3-phase sensor quantities for current and voltage inputs are converted to D-axis and Q-axis variables within the control system processor. These techniques are known in the art for DFIM controls.

The described control system may be used to dampen torsional oscillations of the shaft speed or torque in either the charging (motoring) or discharging (generating) mode for the TFIM 102. The damping network 110 can be exercised in either mode if torsional oscillations exceed a threshold value since the induced voltage and current in this network will exist in either mode. The extra damping effect of the dynamic braking resistor (DBR) network 1012 at the stator port S1 is mainly effective in the discharge mode and is typically open (OFF) in the motoring mode. Alteration of three (or more) electrical machines' inherent impedance by inclusion of the damping network 110 and windings at port R2 raises the natural frequency of torsional oscillation of the mechanical flywheel-machine system to prevent a critical speed from occurring within the preferred range (e.g. 50% to 100% of base speed) of operation of the combined rotating machinery.

Figure 11A:
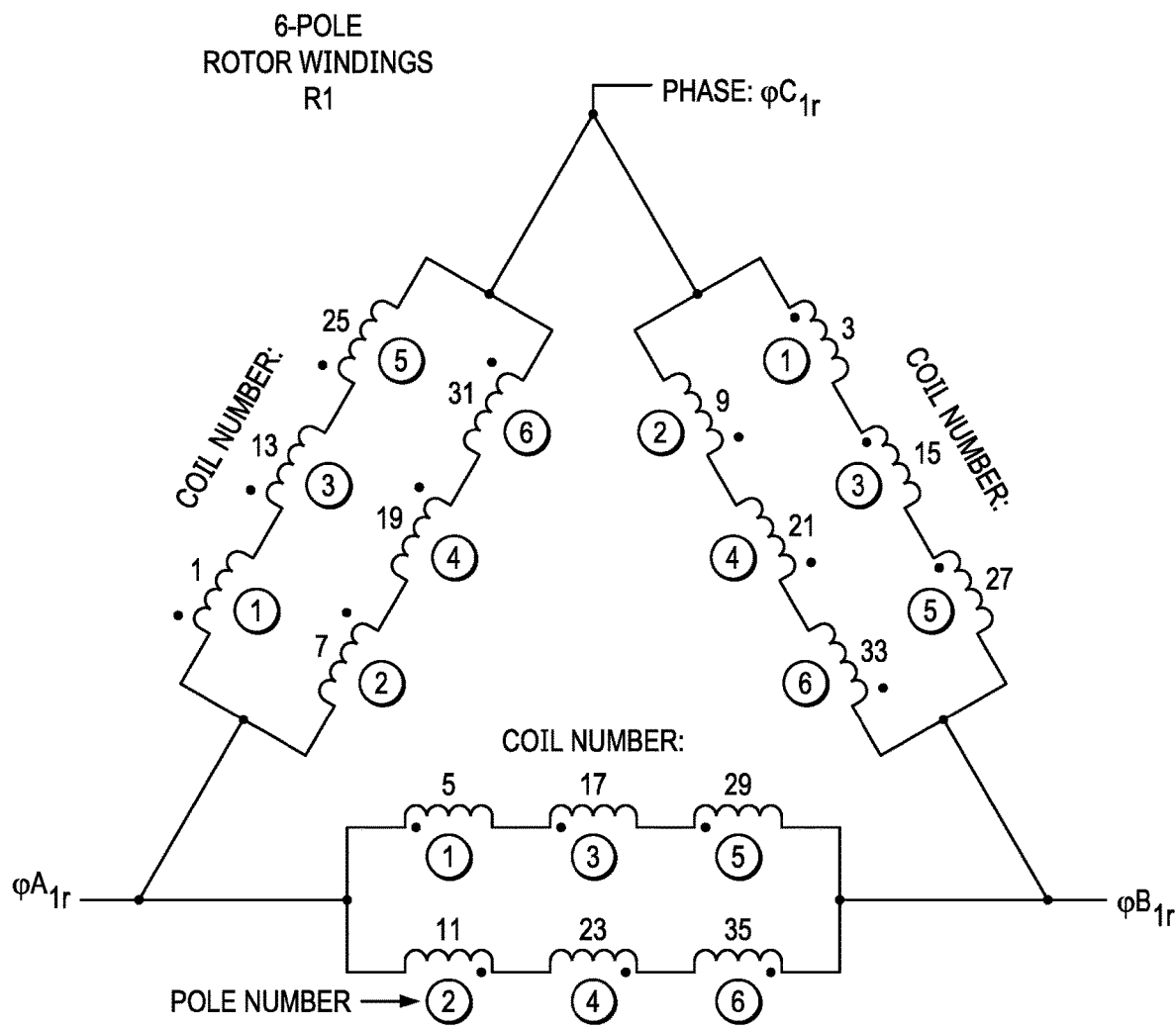
FIGS. 11A through 11C illustrate a schematic layout of an example six-pole triply-fed induction machine according to this disclosure.
Figure 11B:
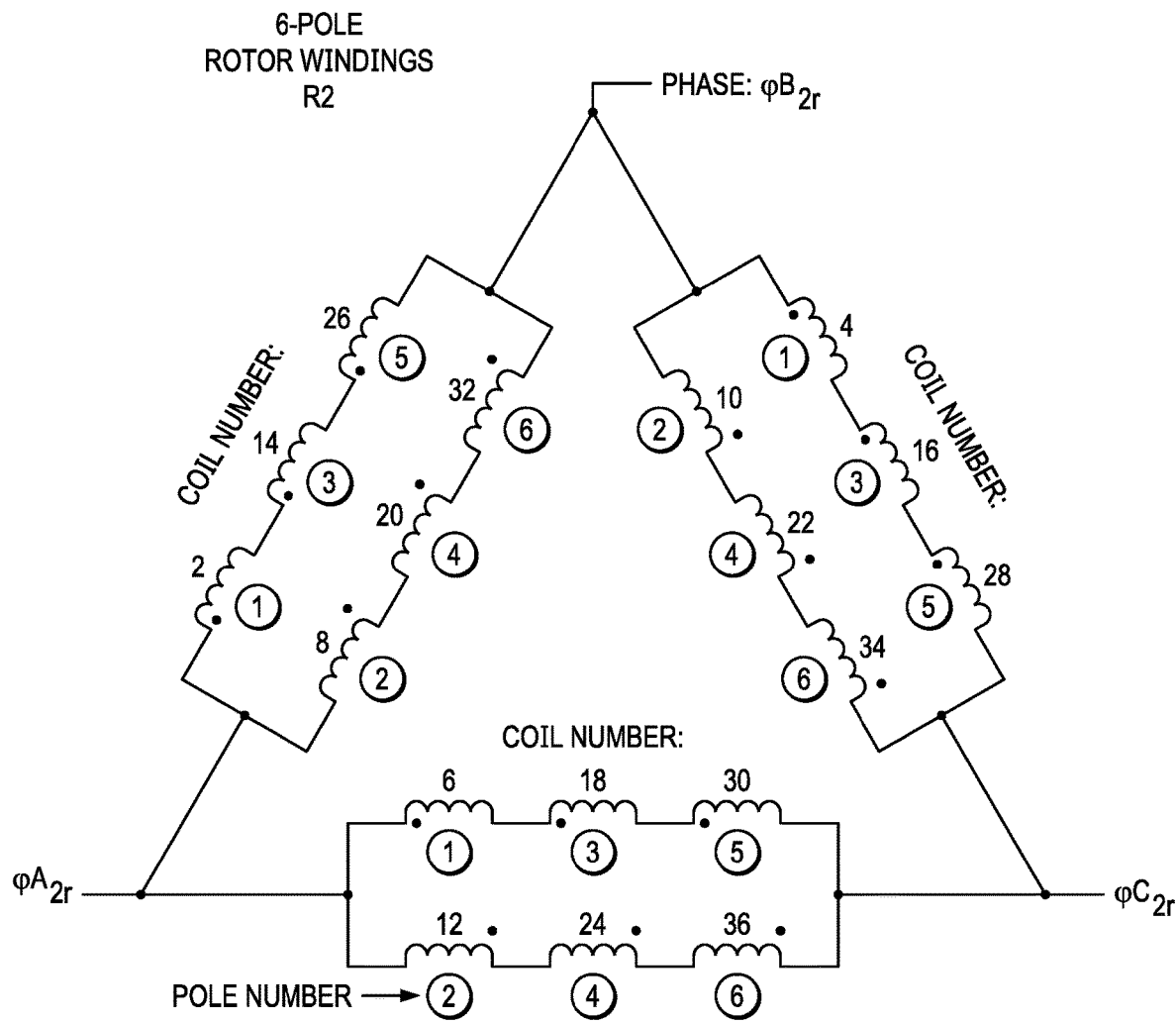
Figure 11C:
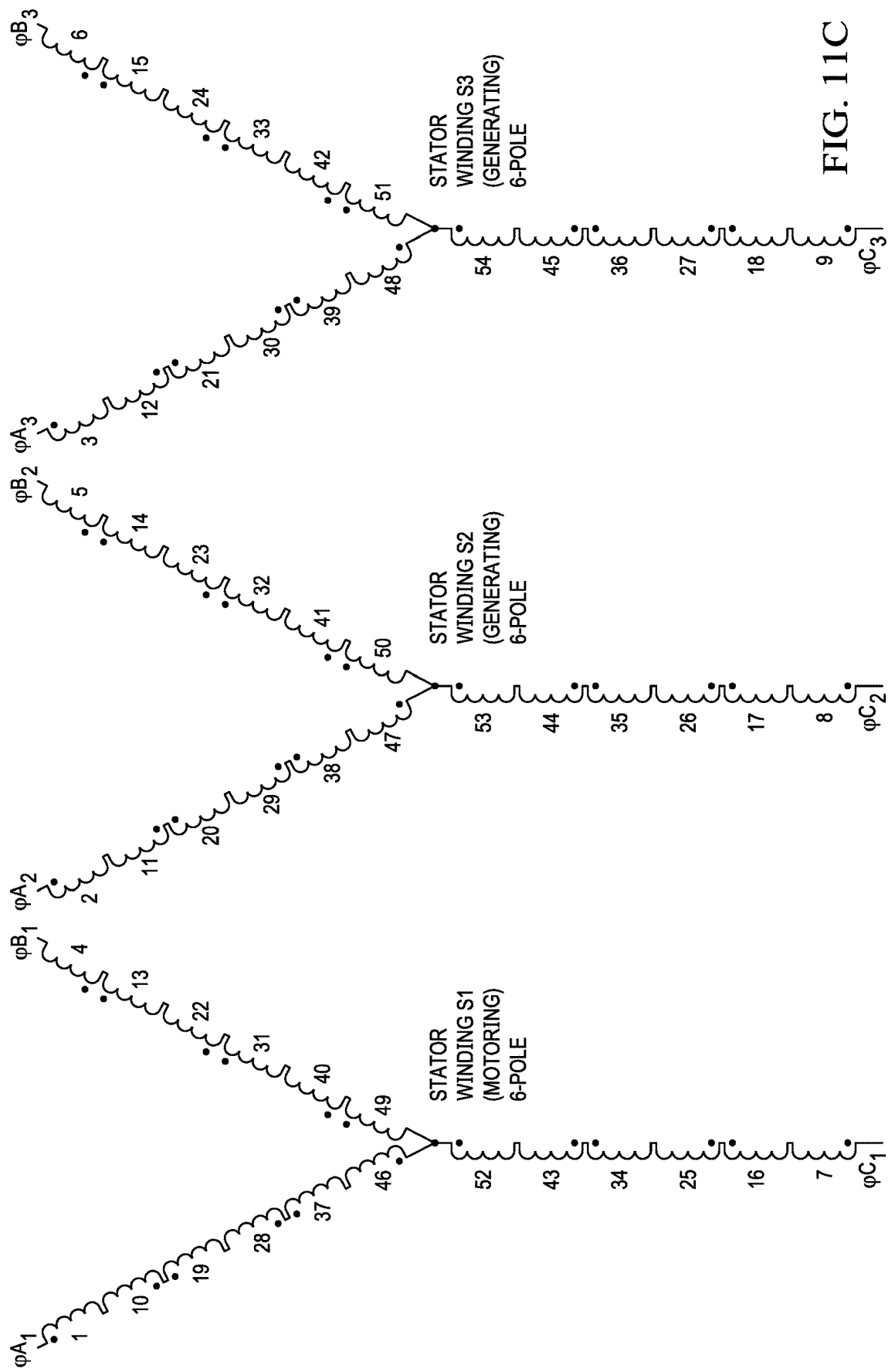

FIGS. 11A through 11C illustrate a schematic layout of an example six-pole TFIM 1100 according to this disclosure. As shown in FIGS. 11A through 11C, the schematic layout of rotor and stator windings shows coil numbers for the TFIM 1100, which is a five-winding TFIM arranged with six poles, where the rotor delta winding R2 is designated for torsional oscillation damping. FIG. 11A shows the rotor winding R1 (main), FIG. 11B shows the rotor winding R2 (special), and FIG. 11C shows the stator windings S1, S2 and S3. A similar winding for a polyphase wye rotor layout is also viable.

The TFIM 1100 has a minimum of three independent stator windings and a minimum of two independent rotor windings. Those of skill in the art will understand that a similar machine in any number of poles can be constructed with greater than three stator windings and greater than two rotor windings to enhance various features such as having multiple load circuits. The two rotor windings have 1 slot/pole/phase with 2 parallels per phase in a total of 36 rotor slots, and three stator windings each having 1 slot/pole/phase in a series winding in a total of 54 stator slots. In FIGS. 11A through 11C, the rotor winding R2 is offset from the rotor winding R1 by 10 electrical degrees; the mutual coupling between the windings R1 and R2 is higher at over 80%. In some embodiments, the winding R2 has a higher number of turns than the winding R1, thereby operating at a higher voltage level for the damping network feed. As discussed above, the phase offset between the windings R1 and R2 can also be constructed to yield a 90 degree shift, producing direct and quadrature axis MMFs respectively.

The embodiment shown in FIGS. 11A through 11C uses a slip ring and brush assembly to transfer currents to the rotor. Further refinement of the TFIM 1100 has R1 and R2 fed by a brushless three-phase exciter and obviates the need for a brush and slip ring assembly. The windings S1, S2 and S3 have an identical number of poles (e.g., six poles) but may have different series turns, chording and distribution factors according to required input or output voltage. The windings S1, S2 and S3 are typically lap wound double-layer coils and the windings R1 and R2 may be concentric or lap wound according to standard industry practice.

Each load circuit attached to the windings S2 and S3 in FIGS. 11A through 11C may have widely different load impedances, different electrical time constants or pulsing rates, or be a steady state load without limitation of this disclosure.

The embodiments disclosed herein provide for the use of an isolated secondary rotor winding for a triply-fed induction machine that includes rapidly adjustable L-C-R damping characteristics and the ability to change power factor as reflected on the line side windings from capacitive to lagging power factor. This creates a power level response in opposition to observed oscillations of machine torque or speed.

Those of skill in the art will understand that the described embodiments can be adapted to multiple energy storage machine sets using triply-fed induction machines as the prime mover, the output power generating machine, or both. Further adaptations of this system can include step-up or step-down transformers to create additional voltage levels without detracting from the basic utility of the embodiments.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A rotating energy storage system comprising:
a power source configured to generate power;
an induction machine coupled to an inertial flywheel, the induction machine configured to receive electrical energy from the power source, store the energy in the flywheel, and deliver a first portion of the energy to a first pulsed load; and
a damping network configured to receive and absorb a second portion of the energy at a controlled rate to regulate torsional oscillations in a rotary motion of the flywheel caused by load swings or pulsations of the first pulsed load.

2. The rotating energy storage system of claim 1, wherein the damping network comprises a polyphase network with a controllable range of leading VAR, lagging VAR, and multiple power dissipation elements, wherein the multiple power dissipation elements comprise:
a saturable polyphase inductor controlled by an external DC bias power supply and configured to vary inductance over a range;
a polyphase resistance bank in series with the saturable polyphase inductor; and
a capacitor bank comprising a combination of fixed and variable capacitors.

3. The rotating energy storage system of claim 1, wherein the induction machine is a wound-rotor induction machine that comprises:
a first stator port configured to receive the energy from the power source;
a second stator port configured to output the first portion of the energy to the first pulsed load; and
a first rotor port coupled to an bidirectional AC power converter providing excitation to the induction machine.

4. The rotating energy storage system of claim 3, wherein the induction machine further comprises:
a third stator port coupled to the damping network.

5. The rotating energy storage system of claim 3, wherein the induction machine further comprises:
a second rotor port coupled to the damping network; and
a third stator port coupled to a second pulsed load, wherein the first pulsed load comprises a DC pulsed load and the second pulsed load comprises an AC pulsed load,
wherein the first stator port includes a shunt resistive polyphase network connected in parallel to lower an effective input impedance of the induction machine.

6. The rotating energy storage system of claim 5, wherein the first rotor port comprises a first winding centered on a rotor direct axis, and the second rotor port comprises a second winding centered on a rotor quadrature axis,
wherein the first and second windings are independently operable for providing rotor excitation or receiving energy from windings of the stator ports.

7. The rotating energy storage system of claim 5, wherein an overall principal resonant speed of the flywheel is altered by operation of the damping network due to changes of a characteristic electrical impedance of a winding of the first stator port or the third stator port.

8. The rotating energy storage system of claim 1, wherein the second portion of the energy received at the damping network comprises both real and reactive power with a leading or lagging power factor.

9. The rotating energy storage system of claim 1, further comprising:
a control system configured to detect oscillations in a rotation speed of the flywheel, determine a frequency of the oscillations, and control operation of the damping network to change a torsional damping response and improve system stability for dynamic load perturbations.

10. The rotating energy storage system of claim 9, wherein the control system comprises:
a load controller configured to switch pulsed loads responsive to both real and reactive power output of a triply-fed induction machine; and
a torsional oscillation damping controller configured to receive input signals of shaft speed, flywheel torque, and line or load power and commands gating and a current level of the damping network, the torsional oscillation damping controller configured to modulate both real and reactive power draw or regeneration at a line input of the triply-fed induction machine to dampen or suppress oscillations in shaft speed or torque.

11. A rotating energy storage system comprising:
a power source configured to generate AC power;
a triply-fed induction machine coupled to an inertial flywheel and comprising multiple stator ports and at least one rotor port, the triply-fed induction machine configured to receive energy from the power source, store the energy in the flywheel, and deliver a first portion of the energy to a first pulsed load; and
a damping network configured to receive a second portion of the energy at a torsional damping voltage to regulate oscillations in a rotation speed of the flywheel caused by load swings or pulsations of the first pulsed load.

12. The rotating energy storage system of claim 11, wherein the damping network comprises a polyphase network with a controllable range of leading VAR, lagging VAR, and multiple power dissipation elements, wherein the multiple power dissipation elements comprise:
a saturable polyphase inductor controlled by an external DC bias power supply and configured to vary inductance over a range;
a polyphase resistance bank in series with the saturable polyphase inductor; and
a capacitor bank comprising a combination of fixed and variable capacitors.

13. The rotating energy storage system of claim 11, wherein the triply-fed induction machine is a wound-rotor induction machine that comprises:
a first stator port configured to receive the energy from the power source;
a second stator port configured to output the first portion of the energy to the first pulsed load; and
a first rotor port coupled to an bidirectional AC power converter providing excitation to the induction machine.

14. The rotating energy storage system of claim 13, wherein the triply-fed induction machine further comprises:
a third stator port coupled to the damping network.

15. The rotating energy storage system of claim 13, wherein the triply-fed induction machine further comprises:
a second rotor port coupled to the damping network; and a third stator port coupled to a second pulsed load, wherein the first pulsed load comprises a DC pulsed load and the second pulsed load comprises an AC pulsed load, wherein the first stator port includes a shunt resistive polyphase network connected in parallel to lower an effective input impedance of the induction machine.

16. The rotating energy storage system of claim 15, wherein the first rotor port comprises a first winding centered on a rotor direct axis, and the second rotor port comprises a second winding centered on a rotor quadrature axis, wherein the first and second windings are independently operable for providing rotor excitation or receiving energy from windings of the stator ports.

17. The rotating energy storage system of claim 15, wherein an overall principal resonant speed of the flywheel is altered by operation of the damping network due to changes of a characteristic electrical impedance of a winding of the first stator port or the third stator port.

18. The rotating energy storage system of claim 11, wherein the second portion of the energy received at the damping network comprises both real and reactive power with a leading or lagging power factor.

19. The rotating energy storage system of claim 11, further comprising:

a control system configured to detect the oscillations in the rotation speed of the flywheel, determine a frequency of the oscillations, and control operation of the damping network to change a torsional damping response and improve system stability for dynamic load perturbations.

20. The rotating energy storage system of claim 19, wherein the control system comprises:

a load controller configured to switch pulsed loads responsive to both real and reactive power output of the triply-fed induction machine; and a torsional oscillation damping controller configured to receive input signals of shaft speed, flywheel torque, and line or load power and commands gating and a current level of the damping network, the torsional oscillation damping controller configured to modulate both real and reactive power draw or regeneration at a line input of the triply-fed induction machine to dampen or suppress oscillations in shaft speed or torque.

* * * * *